(12) United States Patent
Yoshizawa et al.

(10) Patent No.: US 6,335,910 B1
(45) Date of Patent: Jan. 1, 2002

(54) INFORMATION RECORDING APPARATUS CAPABLE OF AVOIDING ERRONEOUS RECORDING OF INFORMATION IN THE EVENT OF EXTERNAL DISTURBANCES DUE TO MOVEMENT

(75) Inventors: Osamu Yoshizawa, Kawagoe; Hiroaki Shibasaki, Tokyo; Junichi Yoshio, Kawagoe; Takayuki Iijima, Kawagoe; Katsuaki Yamanoi, Kawagoe; Jun Shinohara, Kawagoe, all of (JP)

(73) Assignee: Pioneer Electronics Corporation, Tokyo (JP)

( * ) Notice: Subject to any disclaimer, the term of this patent is extended or adjusted under 35 U.S.C. 154(b) by 0 days.

(21) Appl. No.: 09/323,403

(22) Filed: Jun. 1, 1999

(30) Foreign Application Priority Data

Jun. 2, 1998 (JP) ............................................. 10-152922

(51) Int. Cl.$^7$ ................................................. G11B 3/90
(52) U.S. Cl. ................................................... 369/53.18
(58) Field of Search .......................... 369/44.32, 44.33, 369/53.18, 53.12, 53.13, 53.14, 53.15, 53.3, 53.42; 360/75

(56) References Cited

U.S. PATENT DOCUMENTS 4,692,915 A * 9/1987 Moriya et al. ............ 369/53.18
5,317,553 A * 5/1994 Ohga et al. ............... 369/53.18
5,986,845 A * 11/1999 Yamaguchi et al. .......... 360/75

\* cited by examiner

*Primary Examiner*—Paul W. Huber
(74) *Attorney, Agent, or Firm*—Morgan, Lewis & Bockius LLP

(57) ABSTRACT

An information recording apparatus includes recording means for recording information onto a recording medium; detection means for detecting vibrations or possibilities of vibrations of the apparatus; and recording control means for prohibiting or suspending recording of the information onto the recording medium in accordance with a detection result of the detection means.

41 Claims, 4 Drawing Sheets

INFORMATION RECORDING APPARATUS CAPABLE OF AVOIDING ERRONEOUS RECORDING OF INFORMATION IN THE EVENT OF EXTERNAL DISTURBANCES DUE TO MOVEMENT

This Application claims the benefit of Japanese Application No. 10-152922 filed on Jun. 2, 1998, which is hereby incorporated by reference.

BACKGROUND OF THE INVENTION

1. Field of the Invention

The present invention relates to a technique for faithfully recording signals played back by various apparatuses, and more particularly, to an information recording apparatus capable of faithfully recording signals even if external disturbances such as vibrations take place.

2. Description of the Related Art

In recent years, discs have been used as recording media for recording and playing back to general audio and video signals and are coming into wide use. Especially, a recorder/player using Mini Discs (MDs) that are magneto-optical discs and capable of easily recording and playing back music data like the conventional audio cassette tape has enjoyed wide acceptance.

A Mini Disc (MD) is contained within a cartridge like a 3.5-inch floppy disc used in personal computers. A MD has the same maximum recording/playback time of 74 minutes as a compact disc (CD). The sampling frequency is 44.1 kHz and quantization is 16 bits, in the same manner as a CD. However, the amount of data is reduced to about one-fifth by a data compression technique known as adaptive transform acoustic coding (ATRAC) in recording the data in a MD.

In ATRAC, signal is quantized by analog-to-digital conversion in the same way as in a CD. The quantized signal is split into given time periods of up to 11.6 ms and Fourier-transformed into the frequency domain to produce a spectrum consisting of about 1000 frequency components. Priorities are given to these frequency components according to the human perceptual characteristics such as the minimum audible loudness characteristics (the minimum audible loudness at each frequency) and the masking effect (i.e., smaller sounds cannot be heard in the presence of a louder sound). In this way, the signal is coded efficiently.

Although the amount of recorded data is reduced to one-fifth, the perceptual sound quality is only slightly inferior to the quality of CDs because data is compressed by making use of the human perceptual characteristics. Since the disc is very small, the current mainstream application for MDs is small-sized portable consumer products such as headphone stereos.

Heretofore, some MD players have been incorporated in non-portable stereo systems including CD players, radio sets, and Karaoke machines. However, so far no recordable in-car audio MD system is available. Where a MD recorder/player is used as a portable MD device (especially, an in-car audio machine), the portable MD device is simply attached to a car audio machine to function as a recordable in-car MD system.

Therefore, where an audio signal played back by a portable CD player, a radio set, a portable audio device, or an in-car audio machine is dubbed by the disc recorder/player (in this case, a portable MD device), if great vibrations are applied to the device during operation of the vehicle, the position (track) on the MD at which the audio signal is to be recorded deviates from the correct position. As a result, information is recorded at incorrect positions on the MD. If information has been previously recorded at incorrect positions, there is a danger that the information is destroyed.

This is especially true for a user table of contents (TOC) area of the MD which allows the user to program in a playback sequence and playback operation. If the user TOC area of the MD is rewritten, and if wrong information is written into the user TOC due to vibrations, playback of dubbed music is hindered. In addition to areas where music was recorded during vibrations, even music recorded in correct areas and which is capable of being played back normally may not be successfully played back.

FIG. 5 shows one example of the structure of the user TOC area of a MD. This user TOC area consists of 4 bytes (587 data areas, for example. A header 1 indicating a sync pattern consisting of 1 byte pattern of all 0's or 1's is located at the forefront position of the user TOC area to indicate that it is the user TOC area. Data including the first track number (first TNO)4 of the first recorded tune, the last track number (last TNO)5 of the last tune, used sectors 6, disc serial number (Disc Serial No.) 7, and disc ID 8 are recorded at given address positions. Furthermore, various table pointers (P-DFA to P-TN0255) are recorded in a corresponding table-indicating data portion 2 to correspond recorded tunes to a management table portion 3 (described later).

The management table portion 3 has 255 part tables (01-FF). Each part table can record a start address indicating the starting point of a segment of physically continuous tracks, an end address indicating the end point thereof, information about the track mode of the segment, and link information about if this segment is linked to other segment. The link information includes a part table in which the start address and the end address of a segment to be linked are recorded.

In this way, information about the whole volume (disc) is recorded in the user-TOC (U-TOC) area. The U-TOC area is different from the normal music area (program area). If an incorrect recording is made in a portion of the program area, only that portion of the program area is affected. However, if an incorrect recording is made in the U-TOC area, the whole disc might be made unusable in the worst case. Hence, data is required to be written into the U-TOC area with the highest reliability.

As described thus far, in the conventional recorder, if a recording operation is performed during the presence of great vibrations, erroneous information may be recorded. If erroneous information is recorded while the U-TOC of an MD is being rewritten, the whole MD may be destroyed. This leads to the malfunction of the MD.

SUMMARY OF THE INVENTION

Accordingly, the present invention is directed to an improved information recording apparatus that substantially obviates one or more of the problems due to limitations and disadvantages of the related art.

An object of the present invention is to provide an information recording apparatus capable of avoiding erroneous recording even during the presence of great vibrations.

Additional features and advantages of the invention will be set forth in the description which follows, and in part will be apparent from the description or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an information recording apparatus of the present invention includes recording means for recording information onto a recording medium, detection means for detecting a generation of vibration or a possibility of a generation of vibration, and recording control means for prohibiting or suspending recording of the information onto the recording medium on the basis of a detection result of the detection means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provided a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
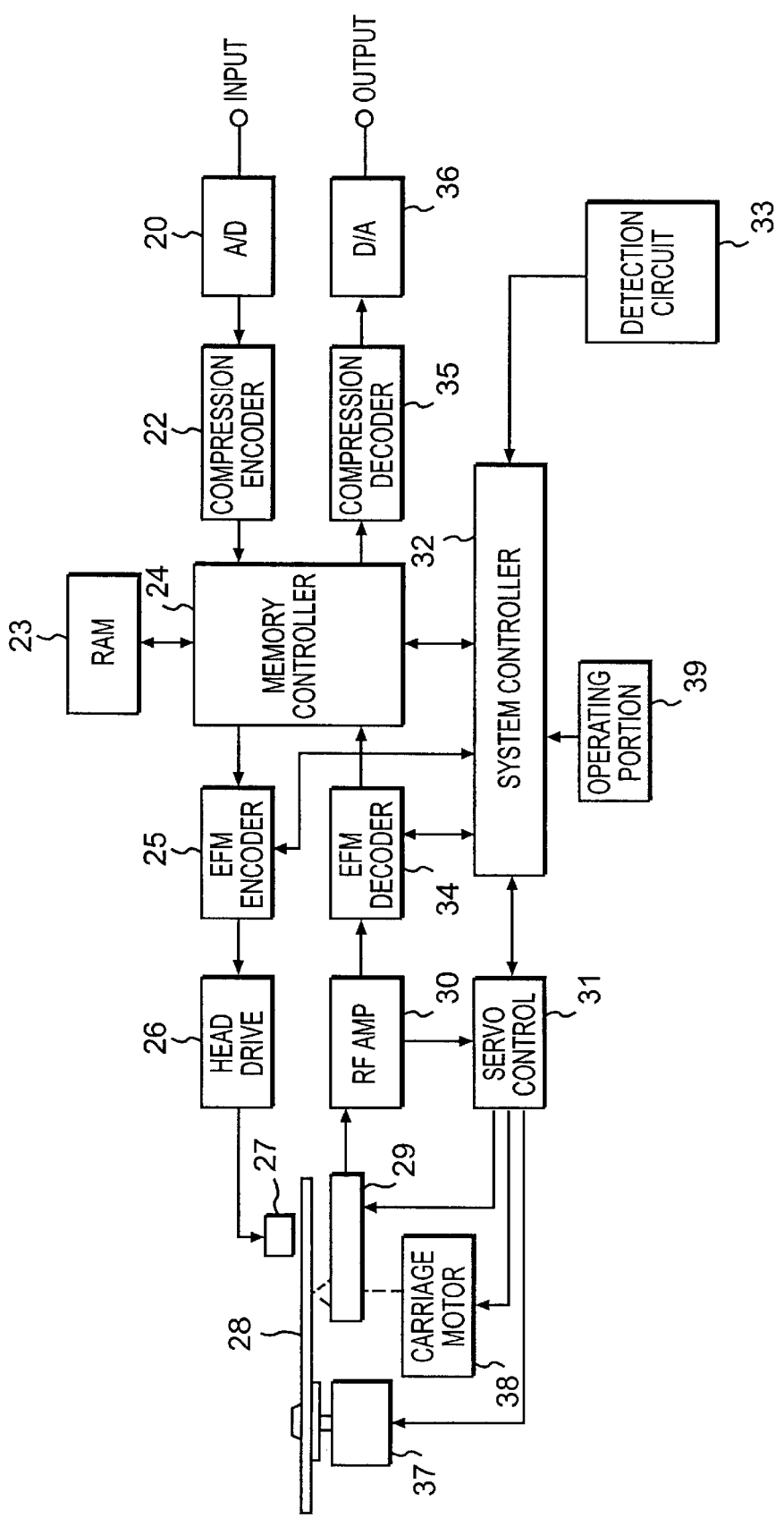
FIG. 1 is a block diagram of a disc recorder/player in accordance with a preferred embodiment of the present invention.

FIG. 1 is a block diagram of a MD recorder/player as an information recording apparatus in accordance with the present invention. In FIG. 1, a digital audio signal is supplied to an audio compression encoder 22 from an audio signal supply means such as a CD player or radio receiver (not shown) via an analog-to-digital converter 20. The compression encoder 22 compresses each block of the applied digital audio signal by using the ATRAC audio compression technique on the time axis.

A memory controller 24 is connected with the audio compression encoder 22 for controlling the writing of signals into and reading of signals from a random access memory (RAM) 23, known as a shockproof memory. The compressed digital audio signal is written into the RAM 23 and then read out in the same sequence as they are written.

The digital signal read from the RAM 23 is provided to an EFM encoder 25 for EFM modulation (eight-to-fourteen modulation) and for error correction using a cross-interleaved reed-solomon coding (CIRC) technique. Then, the signal is supplied to a head drive circuit 26. The head drive circuit 26 drives a writing head 27 according to the signal supplied from the EFM encoder 25 and applies a magnetic field to a Mini Disc (MD) 28.

During recording, a laser beam is emitted by an optical pickup 29 on the surface of the MD 28 which is opposite to where the magnetic field is applied. A signal (magnetic field) supplied from the writing head 27 is recorded in a portion (in practice, certain successive tracks) that is illuminated with the laser beam and thus becomes hot.

During playback, the optical pickup 29 emits a laser beam to read the recorded data. The optical pickup 29 includes a photo-detector that receives the reflected light from the MD 28 and supplies an output signal corresponding to the amount of the received light to an RF amplifier 30.

A servo control circuit 31 is connected with the RF amplifier 30 and operates according to instructions from a system controller 32 including a microcomputer. The servo control circuit 31 performs various servo control operations such as spindle servo, tracking servo, focus servo, and carriage servo according to servo signals obtained from the output signal of the RF amplifier 30.

The MD 28 is rotated by a spindle motor 37 in a spindle servo system, while the optical pickup 29 is moved by a carriage motor 38 in a carriage servo system.

During playback, the output signal from the optical pickup 29 in response to the incoming light is supplied as a read signal to an EFM decoder 34 via the RF amplifier 30. Errors in the read signal are corrected by the EFM decoder 34 with the CIRC technique. Also, the EFM decoder 34 performs an EFM demodulation and supplies the demodulated signal to the memory controller 24.

During playback, the memory controller 24 controls the writing of data into the RAM 23 at a predetermined writing speed. Data is read from the RAM 23 at a lower speed than the writing speed. The data read out is erased from the RAM 23. Data read from the memory controller 24 is supplied to an audio compression decoder 35.

This audio compression decoder 35 decodes the digital audio signal compressed and recorded by the ATEAC audio compression technique. The digital audio signal obtained from the audio compression decoder 35 is then converted into an analog audio signal by a D/A converter 36. The memory controller 24, the EFM encoder 25, and the EFM decoder 34 are all controlled by the system controller 32. This system controller 32 controls the MD recorder/player according to instructions from an operating portion 39 such as an operation panel and a remote controller, and according to various detection results of a detection circuit 33.

Figure 2:
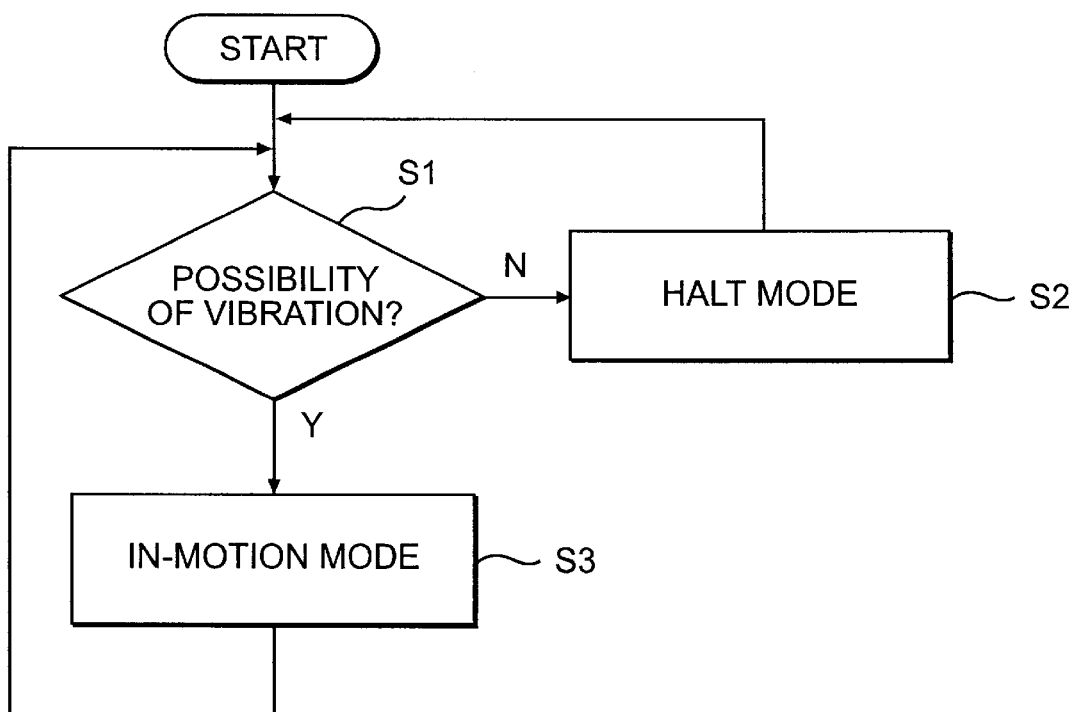
FIG. 2 is a flowchart illustrating an operation performed by the disc recorder/player shown in FIG. 1 for protecting information recorded on a disc.

An operation for protecting the recorded information in accordance with the present invention is next described by referring to FIGS. 1 and 2. FIG. 2 is a flowchart illustrating the operation of the NMD recorder/player in accordance with the present invention to protect the recorded information.

Referring to FIG. 2, the system controller 32 makes a decision according to the detection results of the detection circuit 33 as to whether the MD recorder/player may be subjected to vibrations when it performs dubbing or recording (step S1). For instance, the detection circuit 33 may be connected with a parking sense circuit (not shown) which detects a state of the parking brake of the vehicle. In particular, when the parking brake is applied, the detection circuit 33 judges that the vehicle is at halt. When the parking brake is released, on the other hand, the detection circuit 33 judges that the vehicle is in motion. An acceleration sensor (not shown) may also be installed on the MD player to sense the acceleration. The detection circuit can also detect vehicle speed pulses which varies with the vehicle speed. In summary, the detection circuit 33 detects the output signal from the parking sense circuit, vehicle speed pulses indicating the vehicle speed, and the output signal from the acceleration sensor and sends the corresponding information to the system controller 32.

Other kinds of information can also be used to determine the possibility of vibrations and system malfunction. Examples include error signals (e.g., focus error signal or tracking error signal) of the servo circuits in the MD recorder/player, information about the road condition from a navigation system, information about the state of the brake pedal in conjunction with speed pulses indicating the vehicle speed (e.g., when the vehicle is at halt, the brake pedal may be depressed), and an user's instructions. For example, vibrations are constantly present when the vehicle is in motion and therefore greater error signals are produced in a servo circuit as compared to when the vehicle is at halt. As a result, error signals produced in a servo circuit can be used to determine the possibility of vibrations. Therefore, if the peak value or average value of the error signal is in excess of a predetermined value for a given period, the vehicle can be judged to be in motion.

If the system controller 32 judges according to information from the detection circuit 33 that there is no possibility of vibrations, that is, the vehicle is at halt, the controller puts the MD recorder/player in a "halt mode" and permits all operations of the MD recorder/player (step S2).

If, on the other hand, the system controller 32 judges according to the information from the detection circuit 33 that there is a possibility of vibrations, that is, the vehicle is in motion, the controller puts the MD recorder/player in a "in-motion mode" and prohibits or suspends various operations (step S3). For example, the controller 32 may prohibit or suspend a recording operation, prohibit or suspend only the writing of user TOC information, or prohibit movement of the pickup 29 to inner tracks of the MD 28. The reason to prohibit the movement of the pickup 29 to the inner tracks is that it is highly likely that information has already been recorded in the inner tracks since information is recorded from the inner periphery toward the outer periphery in MDs.

In a MD system, a series of information can be recorded in a plurality of discrete blank areas. The recording operation may be prohibited or suspended only when tunes are recorded in such discrete blank areas because it is highly likely that information has already been recorded in between those blank areas. In this case, the recording operation is started from an unrecorded area located at the outermost side of the disc.

In this way, the operation for protecting recorded information by the disc recorder/player in accordance with the present invention is realized.

Figure 3:
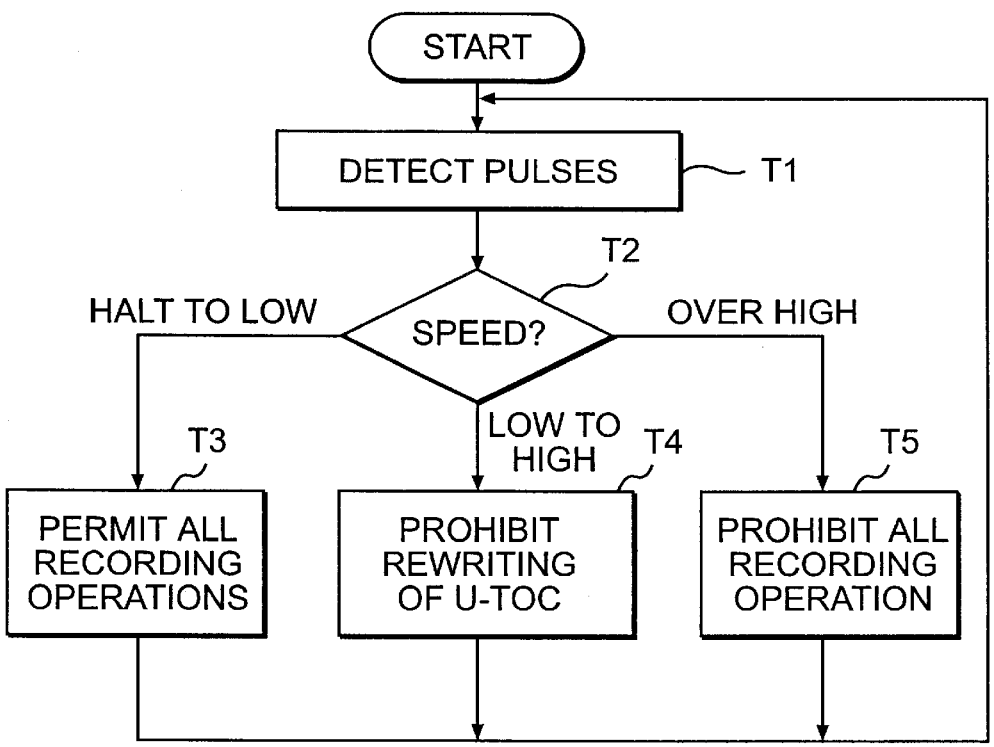
FIG. 3 is a flowchart illustrating an operation performed by the disc recorder/player shown in FIG. 1 for protecting information recorded on a disc, using vehicle speed pulses.

As a specific example, an operation for protecting recorded information in the MD recorder/player in accordance with the present invention is described by referring to the flowchart of FIG. 3. In the embodiment shown in FIG. 3, an operation for protecting recorded information is performed using vehicle speed pulses indicating the vehicle speed.

First, the system controller 32 detects the pulses supplied from or via the detection circuit 33, indicating the vehicle speed (step T1). The current speed of the vehicle is obtained from the detected vehicle speed pulses (step T2). In the present embodiment, vehicle speeds are classified into three ranges: (1) from zero to low speed (slow movement); (2) from low speed to high speed (about the speed limit); and (3) above the high speed. In the low-speed range (1), all operations of the MD recorder/player are permitted (step T3). In the low-to-high speed range (2), some operations, such as writing of U-TOC information, of the MD recorder/player are prohibited (step T4). In above the high-speed range (3), all recording operations of the MD player are prohibited (step T5).

In this manner, protection of information recorded in the MD recorder/player in accordance with the present invention is accomplished. In this specific embodiment, vehicle speeds are classified into, as an example, three speed ranges, and information recorded in the MD recorder/player is protected according to the specific vehicle speed range. Alternatively, where the vehicle speed is simply more than a predetermined speed, some operations such as writing of information into the U-TOC area may be suspended to prevent erroneous recording. When the vehicle speed drops below the predetermined speed, the suspended operation may be enabled.

The vehicle speed and information from the car navigation system can be used together to judge the possibility of vibrations. If the vehicle travels on an urban road at a given speed (e.g., the speed limit), the possibility of vibrations and erroneous recording is high. Therefore, some operations (e.g., writing the U-TOC information) of the MD recorder/player should be prohibited. However, when the vehicle is running on a highway at a given speed (e.g., the speed limit), it is judged that the possibility of vibrations is low. Therefore, all the operations of the MD recorder/player may be enabled.

As mentioned above, information should be written into the user TOC area with the greatest care during recording operations of the MD recorder/player. One example of an operation for suspending the writing (or rewriting) of the U-TOC information is described by referring to the flowchart of FIG. 4.

Figure 4:
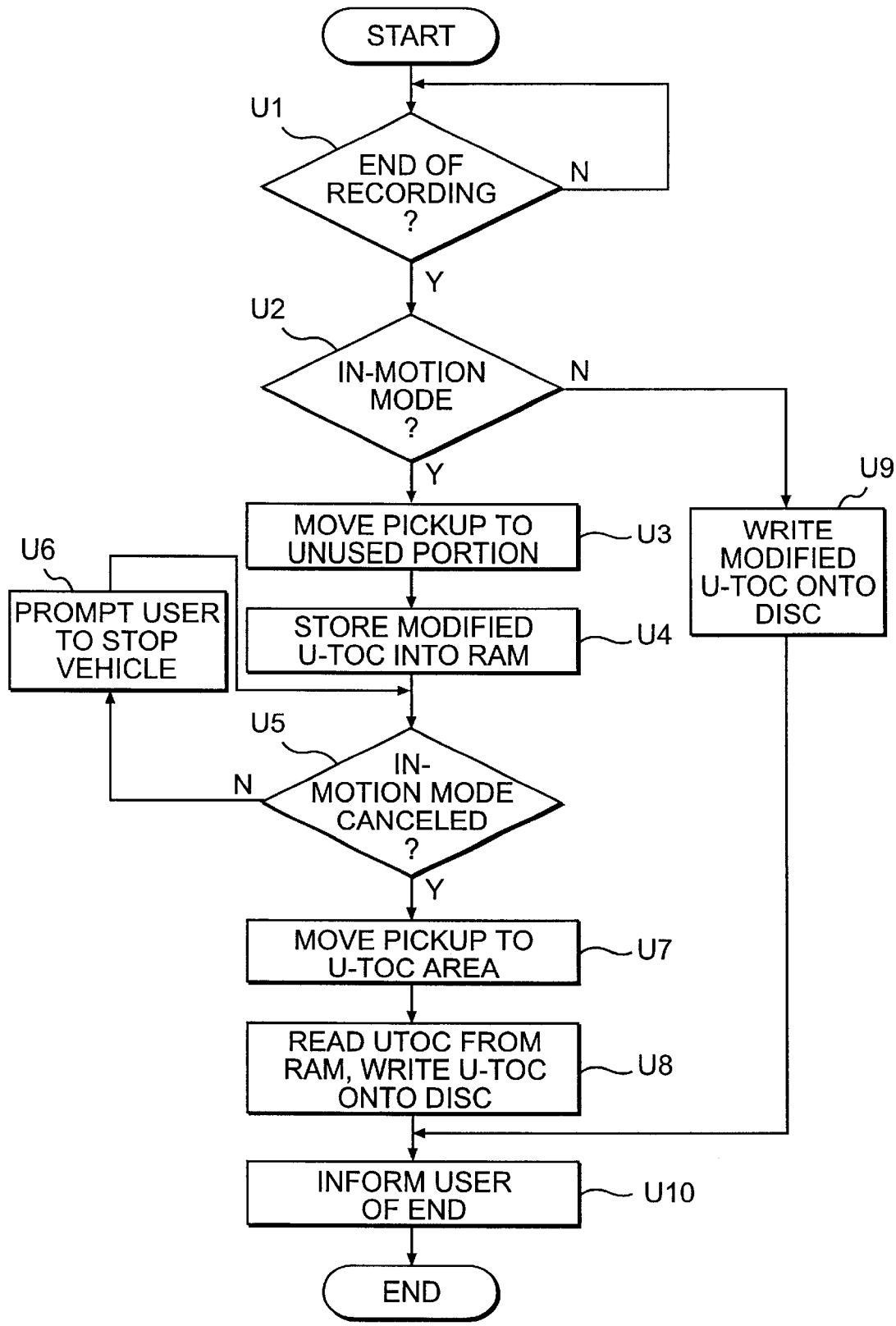
FIG. 4 is a flowchart illustrating a sequence of operations for writing information into the user TOC area of a disc by a disc recorder/player in accordance with the preferred embodiment of the present invention.
Figure 5:
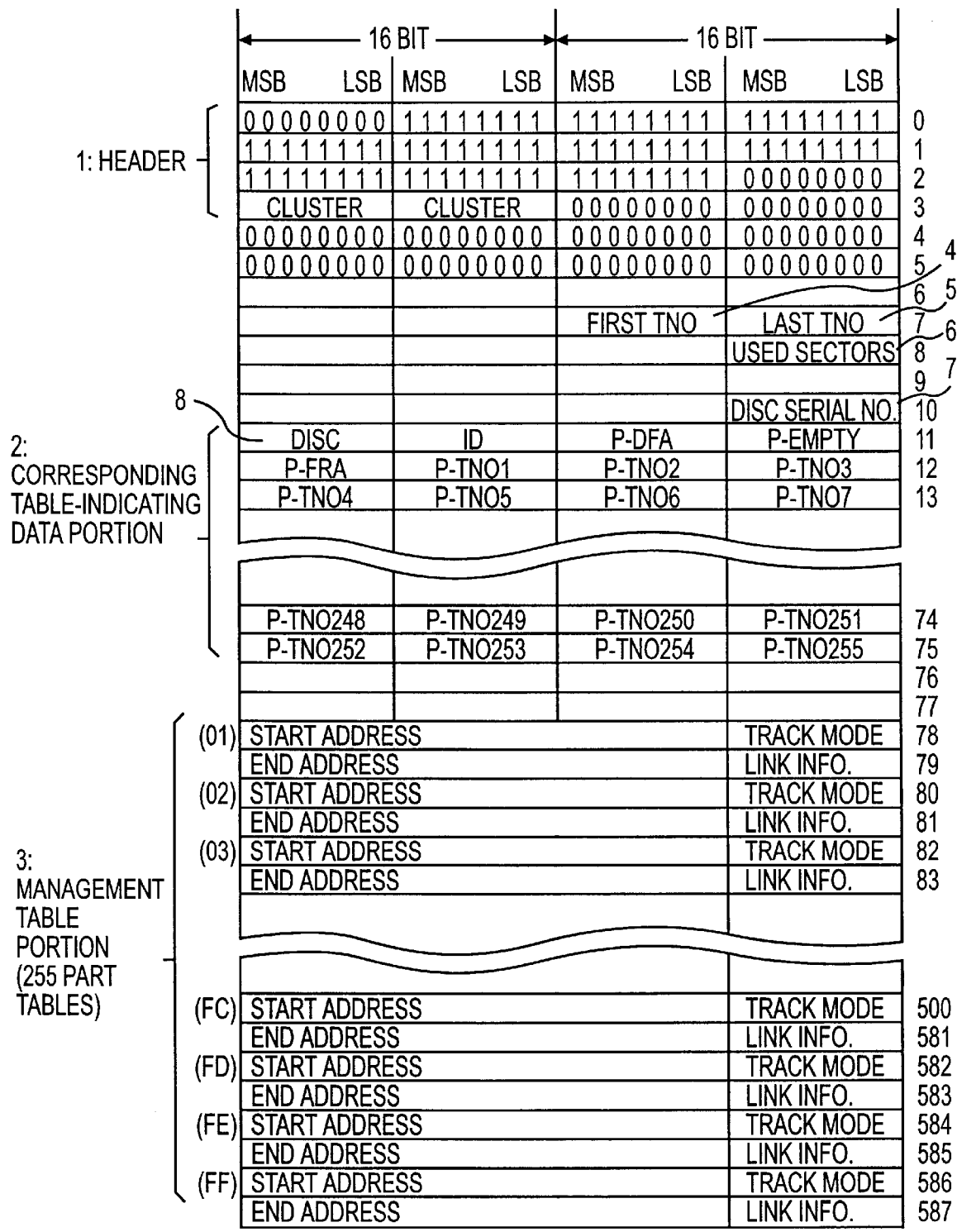
FIG. 5 is a diagram illustrating one example of configuration of a user TOC area in a Mini Disc (MD).

Referring to FIG. 4, upon completing the recording of a piece of music on the MD recorder/player (step U1), the system controller 32 receives various kinds of information from or via the detection circuit 33 (e.g., the output from the parking sense circuit indicating the state of the parking brake, pulses indicating the vehicle speed, the output from the acceleration sensor mounted on the MD recorder/player, and information keyed in by the user). The system controller 32 then makes a decision as to whether the vehicle is moving at present (step U2). If it is judged that the vehicle is not moving, the modified U-TOC information including the newly recorded piece of music as described above is written into the U-TOC area of the MD (step U9) since the possibility of vibrations and erroneous recording on the MD recorder/player is not present. After finishing writing the modified information into the U-TOC area, the MD recorder/player informs the user that the entire recording operation has completed and that the MD can be normally used next time based on the rewritten contents (step U10).

If it is determined in step U2 that the vehicle is moving, i.e., the MD recorder/player may be subjected to vibrations or erroneous recordings may be performed, the controller 32 moves the optical pickup 29 to an unused outer portion of the MD (step U3), thus avoiding erroneous recording. This is because the U-TOC information and music data already recorded are present in inner tracks. In the present embodiment, music can be recorded even when it is determined that the vehicle is moving in step U2. However, a decision is made as to whether U-TOC information can be written, which needs a higher recording accuracy.

As mentioned above, the system controller 32 moves the pickup 29 to an unused outer portion of the MD and controls the memory controller 24 to write the modified U-TOC information into the RAM 23 or a dedicated memory installed separately (step U4).

At this time, only music data has been recorded on the disc thus far and the U-TOC information has not been rewritten. Therefore, the disc can be neither taken out nor replaced. Accordingly, if the vehicle is determined to be still in motion (step US), the system controller 32 prompts the user to stop the vehicle or informs the user that the recording operation (rewriting of the U-TOC information) has not completed by an electronic display, a warning sound, warning light, or the like (step U6).

If it is determined in step U5 that the in-motion mode is canceled, for example, by applying the parking brake, the system controller 32 moves the optical pickup 29 to the inner U-TOC area of the MD (step U7). The saved U-TOC information is read from the memory, and the U-TOC information is written onto the U-TOC area of the MD (step U8). The MD recorder/player then informs the user that the entire recording operation has completed and that the MD can be normally used next time based on the rewritten contents (step U10). Thus, writing of information into the U-TOC area is completed.

Protection of the U-TOC information recorded on the MD recorder/player in accordance with the present invention can be accomplished as described above. In the above embodiment, the operation for protecting the recorded information including the U-TOC information is performed automatically by the system controller 32 according to the information from the detection circuit 33. Alternatively, this protective operation by the system controller 32 can be suspended by a user command from the manual operation portion 39. Conversely, it is also possible to cause the system controller 32 to protect the recorded information, including the U-TOC information, by a user command from the manual operation portion 39 irrespective of information from the detection circuit 33.

The present invention for protecting the recorded information, including the management information, can be employed in various information recording apparatuses such as hard disc drives of in-vehicle computers and mobile computers, CD-R drives, floppy-disc drives, MO drives, and so on.

As described above, according to the information recording apparatus of the present invention, erroneous recording of the information can be avoided even under vibrating or shaky conditions.

It will be apparent to those skilled in the art that various modification and variations can be made in the information recording apparatus of the present invention without departing from the spirit or scope of the invention. Thus, it is intended that the present invention cover the modification and variations of this invention provided they come within the scope of the appended claims and their equivalents.

What is claimed is:

1. An information recording apparatus mounted on a vehicle, comprising:
   recording means for recording information onto a recording medium;
   detection means for detecting vibrations or possibilities of vibrations of the apparatus and whether or not the vehicle is in a drivable state; and
   recording control means for prohibiting or suspending the recording of the information onto the recording medium in accordance with a detection result of the detection means and when the detection means detects that the vehicle is in the drivable state.

2. The apparatus according to claim 1, wherein the detection means detects a state of a parking brake of the vehicle, and
   wherein the recording control means permits the recording of the information onto the recording medium when the detection means detects that the parking brake is applied, and prohibits or suspends the recording of the information onto the recording medium when the detection means detects that the parking brake is released.

3. The apparatus according to claim 1, wherein the detection means detects an amount of vibrations applied to the apparatus, and
   wherein the recording control means prohibits or suspends the recording of the information onto the recording medium based on the amount of vibrations detected by the detection means.

4. The apparatus according to claim 3, wherein the detection means includes an acceleration sensor.

5. The apparatus according to claim 1, wherein the detection means detects an error signal with respect to a relative position of the recording means to the recording medium, and
   wherein the recording control means prohibits or suspends the recording of the information onto the recording medium based on the error signal detected by the detection means.

6. The apparatus according to claim 1, wherein the recording medium comprises a management information area in which management information indicating a reproduction order of information is recorded on the medium, and
   wherein the recording control means prohibits or suspends recording of the management information onto the management information area of the recording medium in accordance with the detection result of the detection means.

7. The apparatus according to claim 1, wherein the recording medium is a disc for recording information from an inner periphery towards an outer periphery, and
   wherein the recording control means prohibits movement of the recording means towards the inner periphery on the basis of the detection result by the detection means.

8. The apparatus according to claim 1, wherein information is recorded either in a continuous area or discrete areas of the recording medium, and
   wherein the recording control means prohibits recording of the information in the discrete areas of the recording medium based on the detection result by the detection means.

9. An information recording apparatus mounted on a vehicle, comprising:
   recording means for recording information onto a recording medium;
   detection means for detecting vibrations or possibilities of vibrations of the apparatus and whether the vehicle is in motion or at halt; and
   recording control means for permitting the recording of the information onto the recording medium when the detection means detects that the vehicle is at halt, and prohibiting or suspending the recording of the information onto the recording medium in accordance with a detection result of the detection means and when the detection means detects that the vehicle is in motion.

10. The apparatus according to claim 9, wherein the detection means detects an amount of vibrations applied to the apparatus, and wherein the recording control means prohibits or suspends the recording of the information onto the recording medium based on the amount of vibrations detected by the detection means.

11. The apparatus according to claim 10, wherein the detection means includes an acceleration sensor.

12. The apparatus according to claim 9, wherein the detection means detects an error signal with respect to a relative position of the recording means to the recording medium, and
   wherein the recording control means prohibits or suspends the recording of the information onto the recording medium based on the error signal detected by the detection means.

13. The apparatus according to claim 9, wherein the recording medium comprises a management information area in which management information indicating a reproduction order of information is recorded on the medium, and
   wherein the recording control means prohibits or suspends recording of the management information onto the management information area of the recording medium in accordance with the detection result of the detection means.

14. The apparatus according to claim 9, wherein the recording medium is a disc for recording information from an inner periphery towards an outer periphery, and
   wherein the recording control means prohibits movement of the recording means towards the inner periphery on the basis of the detection result by the detection means.

15. The apparatus according to claim 9, wherein information is recorded either in a continuous area or discrete areas of the recording medium, and
   wherein the recording control means prohibits recording of the information in the discrete areas of the recording medium based on the detection result by the detection means.

16. An information recording apparatus mounted on a vehicle, comprising:
   recording means for recording information onto a recording medium;
   detection means for detecting vibrations or possibilities of vibrations of the apparatus and a speed of the vehicle; and
   recording control means for prohibiting or suspending the recording of the information onto the recording medium in accordance with a detection result of the detection means and based on the speed of the vehicle detected by the detection means.

17. The apparatus according to claim 16, wherein the detection means also detects a road condition, and the recording control means prohibits or suspends the recording of the information onto the recording medium based on the speed of the vehicle and the road condition.

18. The apparatus according to claim 16, wherein the recording control means prohibits or suspends the recording of the information onto the recording medium either partially or completely based on the speed of the vehicle detected by the detection means.

19. The apparatus according to claim 16, wherein the detection means detects an amount of vibrations applied to the apparatus, and
   wherein the recording control means prohibits or suspends the recording of the information onto the recording medium based on the amount of vibrations detected by the detection means.

20. The apparatus according to claim 19, wherein the detection means includes an acceleration sensor.

21. The apparatus according to claim 16, wherein the detection means detects an error signal with respect to a relative position of the recording means to the recording medium, and
   wherein the recording control means prohibits or suspends the recording of the information onto the recording medium based on the error signal detected by the detection means.

22. The apparatus according to claim 16, wherein the recording medium comprises a management information area in which management information indicating a reproduction order of information is recorded on the medium, and
   wherein the recording control means prohibits or suspends recording of the management information onto the management information area of the recording medium in accordance with the detection result of the detection means.

23. The apparatus according to claim 16, wherein the recording medium is a disc for recording information from an inner periphery towards an outer periphery, and
   wherein the recording control means prohibits movement of the recording means towards the inner periphery on the basis of the detection result by the detection means.

24. The apparatus according to claim 16, wherein information is recorded either in a continuous area or discrete areas of the recording medium, and
   wherein the recording control means prohibits recording of the information in the discrete areas of the recording medium based on the detection result by the detection means.

25. An information recording apparatus comprising:
   recording means for recording information onto a recording medium;
   detection means for detecting vibrations or possibilities of vibrations of the apparatus;
   recording control means for prohibiting or suspending recording of the information onto the recording medium in accordance with a detection result of the detection means; and
   manual control means for manually releasing or activating the prohibition or suspension of the recording of the information regardless of the detection result of the detection means.

26. The apparatus according to claim 25, wherein the detection means detects an amount of vibrations applied to the apparatus, and
   wherein the recording control means prohibits or suspends the recording of the information onto the recording medium based on the amount of vibrations detected by the detection means.

27. The apparatus according to claim 26, wherein the detection means includes an acceleration sensor.

28. The apparatus according to claim 25, wherein the detection means detects an error signal with respect to a relative position of the recording means to the recording medium, and
   wherein the recording control means prohibits or suspends the recording of the information onto the recording medium based on the error signal detected by the detection means.

29. The apparatus according to claim 25, wherein the recording medium comprises a management information area in which management information indicating a reproduction order of information is recorded on the medium, and
   wherein the recording control means prohibits or suspends recording of the management information onto the management information area of the recording medium in accordance with the detection result of the detection means.

30. The apparatus according to claim 25, wherein the recording medium is a disc for recording information from an inner periphery towards an outer periphery, and wherein the recording control means prohibits movement of the recording means towards the inner periphery on the basis of the detection result by the detection means.

31. The apparatus according to claim 25, wherein information is recorded either in a continuous area or discrete areas of the recording medium, and wherein the recording control means prohibits recording of the information in the discrete areas of the recording medium based on the detection result by the detection means.

32. An information recording apparatus mounted on a vehicle, comprising:

a recording unit for recording information onto the recording medium;

a detector for detecting vibrations or possibilities of vibrations of the recording apparatus and at least one of a state of a parking brake of the vehicle, a speed of the vehicle, an error signal with respect to a relative position of the recording unit to the recording medium, a road condition, and an acceleration status of the vehicle; and a controller for suspending recording of the information onto the recording medium in accordance with the detection result of the detector.

33. The apparatus according to claim 32, wherein the recording unit includes an optical pickup for emitting a laser beam onto the recording medium and a writing head for supplying a magnetic signal to the recording medium.

34. An information recording apparatus, comprising:

a recording unit for recording information onto the recording medium;

a detector for detecting vibrations or possibilities of vibrations of the apparatus; and a controller for suspending recording of the information onto the recording medium in accordance with a detection result of the detector, wherein the controller suspends the recording of a first portion of the information onto the recording medium and enables the recording of a second portion of the information onto the recording medium based on the detection result of the detector, the first portion of the information requiring a higher reliability when compared to the second portion of the information.

35. The apparatus according to claim 34, wherein the first portion of the information includes management information indicating a reproduction order of recorded information on the recording medium, and the second portion of the information includes regular program information.

36. The apparatus according to claim 34, wherein the recording unit includes an optical pickup for emitting a laser beam onto the recording medium and a writing head for supplying a magnetic signal to the recording medium.

37. An information recording apparatus, comprising:

a recording unit for recording information onto the recording medium;

a detector for detecting vibrations or possibilities of vibrations of the apparatus; and a controller for suspending recording of the information onto the recording medium in accordance with a detection result of the detector; and a manual unit for a user to manually control the controller regardless of the detection result of the detector, thus suspending or activating recording of the information onto the recording medium.

38. The apparatus according to claim 37, wherein the recording unit includes an optical pickup for emitting a laser beam onto the recording medium and a writing head for supplying a magnetic signal to the recording medium.

39. A method of recording information onto a recording medium, comprising the steps of:

detecting vibrations or possibilities of vibrations of the recording medium;

suspending recording of a first portion of the information onto the recording medium if vibrations or possibilities of vibrations are detected in the detecting step;

enabling the recording of a second portion of the information onto the recording medium, wherein the first portion of the information requires a higher reliability to be recorded compared to the second portion of the information; and recording the information onto the recording medium if no vibrations or possibilities of vibrations are detected in the detecting step.

40. The method according to claim 39, wherein the detecting step includes detecting whether the recording medium is in motion.

41. The method according to claim 39, wherein the detecting step includes detecting an amount of error signals related to vibrations of the recording medium.

\* \* \* \* \*